United States Patent [19]

Gupta et al.

[11] 4,319,352

[45] Mar. 9, 1982

[54] TIM BUS STRUCTURE

[75] Inventors: Shanti S. Gupta, Gaithersburg, Md.; Brady Warner, Santa Maria, Calif.; Joseph H. Deal, Jr., Clarksburg, Md.

[73] Assignee: Communications Satellite Corporation, Washington, D.C.

[21] Appl. No.: 79,602

[22] Filed: Sep. 27, 1979

[51] Int. Cl.³ .............................................. H04J 3/16
[52] U.S. Cl. ...................................... 370/104; 370/79
[58] Field of Search ................... 370/104, 92, 109, 91, 370/112, 93, 99, 79; 364/200

[56] References Cited

U.S. PATENT DOCUMENTS 3,806,879  4/1974  Schmidt et al. ...................... 370/104
4,105,973  8/1978  Arnold et al. ....................... 370/104
4,135,059  1/1979  Schmidt .............................. 370/104
4,135,060  1/1979  Heckel et al. ....................... 370/104

Primary Examiner—Douglas W. Olms
Attorney, Agent, or Firm—Sughrue, Mion, Zinn, Macpeak and Seas

[57] ABSTRACT

A plurality of terrestrial interface modules (TIMs) are multiplexed and demultiplexed with common equipment through the use of mapping RAMs contained in each TIM. The common equipment provides identical addresses to each of the mapping RAMs in the TIMs. The mapping RAMs in each TIM determine whether incoming or outgoing data is to be written into or read from the associated TIM, and generate an address for the data so written into or read from the TIM. A mapping RAM is further provided in the common equipment to allow for burst-to-burst selection of data.

22 Claims, 6 Drawing Figures

RECEIVE

TIM BUS STRUCTURE

FIELD OF THE INVENTION

The invention relates to the field of satellite communications and relates to data rearrangement and allocation among a plurality of users in a time multiplexed environment.

The invention herein disclosed finds particular utility when employed in conjunction with satellite communication apparatus and techniques generally disclosed in the following commonly assigned, co-pending, concurrently filed U.S. Patent applications, the disclosures of which are hereby incorporated by reference:
1. "TDM Data Reorganization Apparatus", by Warner, Ser. No. 79,601
2. "Decoding TIM Bus Structure", by Dobyns, Ridings, and Lindstrom, Ser. No. 79,665
3. "Microprogrammable TDMA Terminal Controller", by Deal, Ser. No. 79,619
4. "Interleaved TDMA Terrestrial Interface Buffers", by Deal, Ser. No. 79,681
5. "Digital Phase Lock Loop for TIM Frequency Using Frequency Synthesis Technique", by Gupta, Ser. No. 79,671
6. "A High Resolution Frequency Synthesizer", by Gupta, Ser. No. 79,603

BACKGROUND OF THE INVENTION

Prior art pulse code modulation (PCM) time division multiplexed (TDM) communications typically involve sampling a plurality of channels in a sequence of time and producing a digital word related to the value of the individual channel so sampled. After each of the channels has been sampled, the process is repeated a number of times to produce a PCM frame. Although this is a standard technique of providing PCM/TDM data, the bit stream so organized is difficult to handle for certain applications insofar as the digital samples for the various channels are interleaved. Furthermore, an interruption at a particular point of time in the transmission of the data stream will cause a temporary loss of information in substantially all of the communication channels.

The ground stations of satellite communications systems generally involve a plurality of users attached to the ground station transmitter through common equipment. In prior art systems the plurality of users or "interface modules" were multiplexed and demultiplexed to and from the common equipment generally by employing well-known multiplexers and demultiplexers. The bus structures involved in the multiplexing/demultiplexing operations were configured in a variety of ways such as the radial, party-line (bus), or daisy chain configuration. These prior art techniques are generally large in size and inflexible in nature. That is, the channel allocation for each burst of data for each of the interface modules must be preset by the multiplexer/demultiplexer and changes in channel and/or burst allocation for any one of the interfaced modules requires a substantial reorganization of the multiplex/demultiplex operation.

SUMMARY OF THE INVENTION

The present invention avoids the above-mentioned difficulties, by first, effecting a reorganization of the PCM data streamm so as to pack all the bits associated with a single channel into a single contiguous block of time for the entire frame of data. The reorganization is accomplished by writing PCM data into buffer memories in a sequentail order. Upon reading the PCM data from the memories, however, a different order of data selection is effected and functions to remove an individual channel from the complete sequence of PCM frames, whereupon the next channel of data is similarly extracted from the same series of PCM frames. The reorganization of data is physically accomplished by simply exhanging selected bits on the write address and read address lines.

The subject invention further provides a unique multiplexing/demultiplexing bus structure which employs mapping RAMs in each interface module as well as in the common equipment. The common equipment provides identical addresses to each of the mapping RAMs in the interface modules. The mapping RAMs in each interface module determine whether incoming or outgoing data is respectively written into or read from the associated interface module, and generate an address for the data which is written into or read from the interface module. The mapping RAM provided in the common equipment allows for burst-to-burst selection of data.

DETAILED DESCRIPTION OF THE INVENTION

Figure 1:
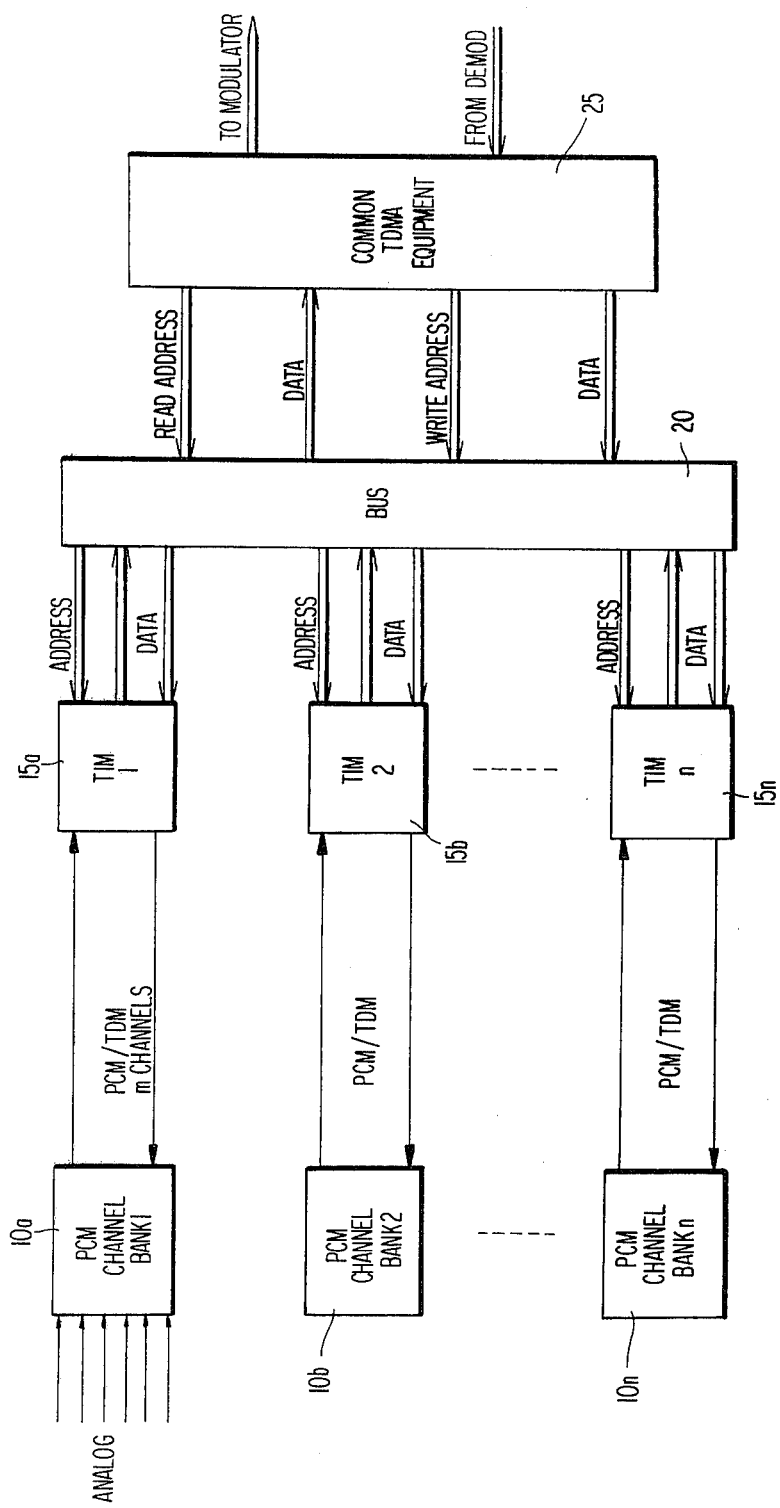
FIG. 1 is a schematic illustration of a single ground station having a plurality of PCM channel banks and terrestrial interface modules in communication with common time division multiple access equipment.

FIG. 1 is a schematic illustration of the relevant portion of the TDMA circuit with which the present invention is concerned. A plurality of analog channels which may be comprised of simple telephone lines for example are input to an associated 1 out of n PCM channel banks 10a through 10n. Each PCM channel bank converts the parallel analog input signals to pulse code modulated (PCM) time division multiplexed (TDM) serial bit streams which are applied to an associated 1 out of n terrestrial interface modules (TIM) 15a through 15n. Under the selective control of common TDMA (time division multiple access) equipment 25, the data from the appropriate TIM is delivered to bus 20 at the proper time where it is then delivered to the common TDMA equipment 25. The common TDMA equipment 25 processes the data so provided and delivers it to a modulator. The processing involved in the common TDMA equipment and subsequent modulation does not represent a part of the subject invention.

Data returning to the common TDMA equipment 25 from the demodulator is applied to the appropriate TIM module through bus 20 at the proper time. The appropriate TIM module is selected by the common equipment 25 by providing an address to all of the TIM modules simultaneously; the particular address so provided will cause the data to be written into only one of the TIM modules 15a through 15n. The data words provided to the TIM modules 15a through 15n are subsequently delivered to PCM channel banks 10a through 10n where they are demultiplexed and provided as a plurality of parallel analog signals from each of the channel banks.

Figure 2:
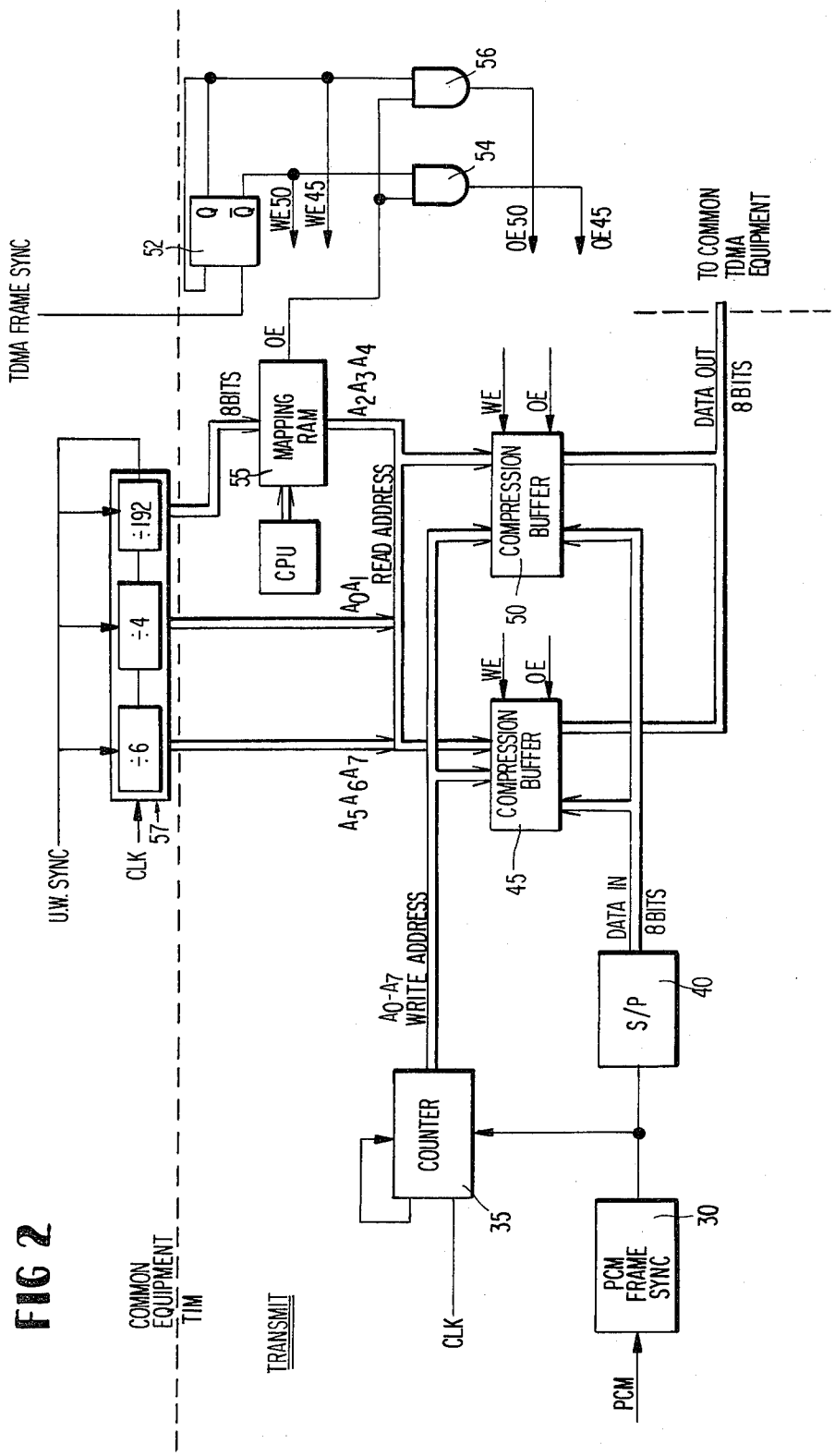
FIG. 2 illustrates the interrelationship between the common equipment and each of the terrestrial interface modules for the transmit portion of the ground station.

The invention is described in greater detail with reference to FIGS. 2-5. FIG. 2 illustrates the transmit portion of one of the TIM's of FIG. 1 and the associated common TDMA equipment with which it communicates through bus structure 20. The PCM encoded data is delivered to PCM frame synchronization means 30 which detects the position of each PCM frame and delivers a frame synchronization signal to counter 35 which is clocked at a rate equal to the PCM data word rate. While the various synchronization signals referred to throughout this specification may be provided in any well-known manner, the synchronization signals may be provided in accordance with the teachings of co-pending U.S. Patent Application, Ser. No. 79,619, commonly assigned and concurrently filed herewith. The PCM encoded data is then delivered to serial to parallel converter 40 where the serial PCM data is converted to a parallel format. The parallel PCM data is delivered along an 8 bit data bus to one of two tri-state compression buffers 45 or 50 under the selective control of write enable pulses delivered to one of the compression buffers from flip-flop means 52. The flip-flop means 52 is synchronized with the TDMA frame in a well-known manner and provides a "ping-pong" action between compression buffers 45 and 50. The PCM data is written into one of the buffers 45 or 50 at a location determined by counter 35 which provides an address along the write address bus.

Contemporaneously with the write operation in one of compression buffers 45 and 50, a read operation is performed on the other of compression buffers 45 and 50 under the control of flip-flop means 52, mapping RAM 55 and AND gates 54 and 56. The mapping RAM 55 provides the output enable signal OE whenever data is to be read into one of compression buffers 45 and 50. The signal OE is further combined with the write enable signals WE 45 and WE 50 in AND gates 54 and 56 so that data is output from the compression buffer which does not have a write enable signal applied to it at that particular point in time. The data from the other of compression buffers 45 and 50 is read from an address provided on the read address bus as shown in the Figure. The read address is provided from both the counter circuit 57 in the common TDMA equipment which counts at a clock rate equal to the PCM data word rate and from mapping RAM 55. The common TDMA equipment provides address bits $A_0$, $A_1$, $A_5$, $A_6$ and $A_7$ while mapping RAM 55 provides bits $A_2$ through $A_4$.

Figure 4:
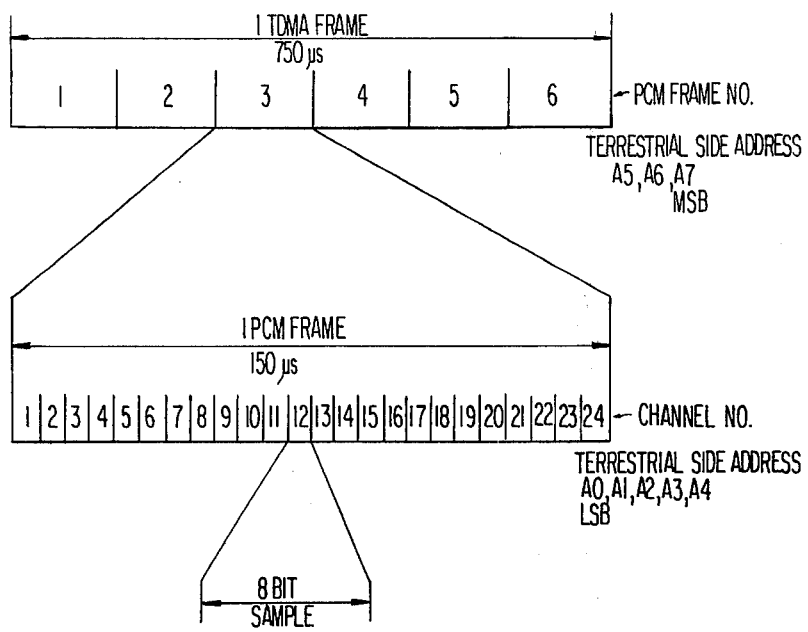
FIG. 4 illustrates the PCM data throughout an entire TDMA frame.
Figure 6:
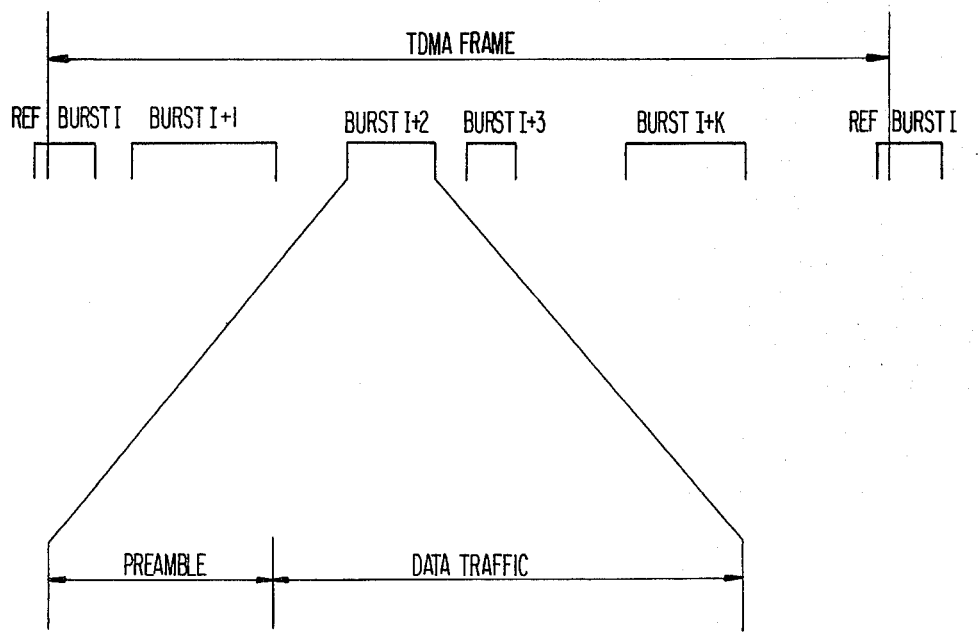
FIG. 6 illustrates the format of an entire frame of TDMA data transmitted from the ground station to a satellite link.

The data is rearranged upon reading from compression buffers 45 or 50 in a manner explained with reference to FIGS. 5 and 6. FIG. 4 illustrates the data bit stream of 8 bit parallel PCM data provided from serial to parallel converter 40 to one of compression buffers 45 or 50. Each of the PCM channel banks 10a through 10n, FIG. 1, provides 24 channels of PCM data to the TIM. Each of the channels in one PCM frame comprise a single 8 bit sample from the individual channel. The time division multiplexed nature of the PCM frame is illustrated in FIG. 4 where it is seen that an 8 bit data sample from channel 1 is immediately followed by an 8 bit data sample from channel 2 and so on through channel 24. The PCM frame repeats itself upon reaching channel 24 wherein the next 8 bit sample will be from channel 1. In this manner, a single TDMA frame comprised of 6 sequential PCM frames (total of 750 ms) is established. It should be noted that the number of PCM frames contained in a TDMA frame is a matter of choice and can be varied to accommodate the user's needs.

FIG. 4 also illustrates the address allocated to each of the PCM data samples from each of the channels. Since there are 24 channels in a single PCM frame, the particular channel in a PCM frame can be identified with a minimum of 5 bits ($2^5=32$), namely $A_0$ through $A_4$. The particular PCM PCM frame that the channel is contained in can be identified by a minimum of 3 bits ($2^3=8$), namely $A_5$ through $A_7$. In other words, bits $A_0$ through $A_4$ indicate to which of channels 1 through 24 the 8 bit sample belongs, while bits $A_5$ through $A_7$ indicate to which of PCM frame numbers 1-6 the 8 bit sample belongs. The bits $A_0$ through $A_7$ are provided to the write address inputs of compression buffers 45 and 50 by means of counter 35 synchronized to each of the PCM 8 bit samples as discussed with reference to FIG. 2. The address bus from counter 35 is tied to the write input lines of buffers 45 and 50 so as to make bit $A_0$ the least significant while $A_7$ is the most significant bit.

The data is read out of the other of compression buffers 45 or 50 under the control of the read address bus which is provided with a portion of the address by mapping RAM 55 and a second portion of the address from the common TDMA equipment. The bits $A_0$ through $A_7$ are provided to the compression buffers 45 or 50 in an order different than that provided for the write address. Specifically, with reference to FIG. 5 it is seen that the address is comprised of address bit $A_5$ as the least significant bit in the address followed by $A_6$, $A_7$ and $A_0$ through $A_4$, $A_4$ being the most significant bit. Leading the data out of memory in this manner effects a reorganization of the data so as to pack all the bits associated with a single channel into a single contiguous block of time for an entire TDMA frame. This structure allows the data mapping, described below, to be independent of the number of PCM frames in a TDMA frame length.

Figure 5:
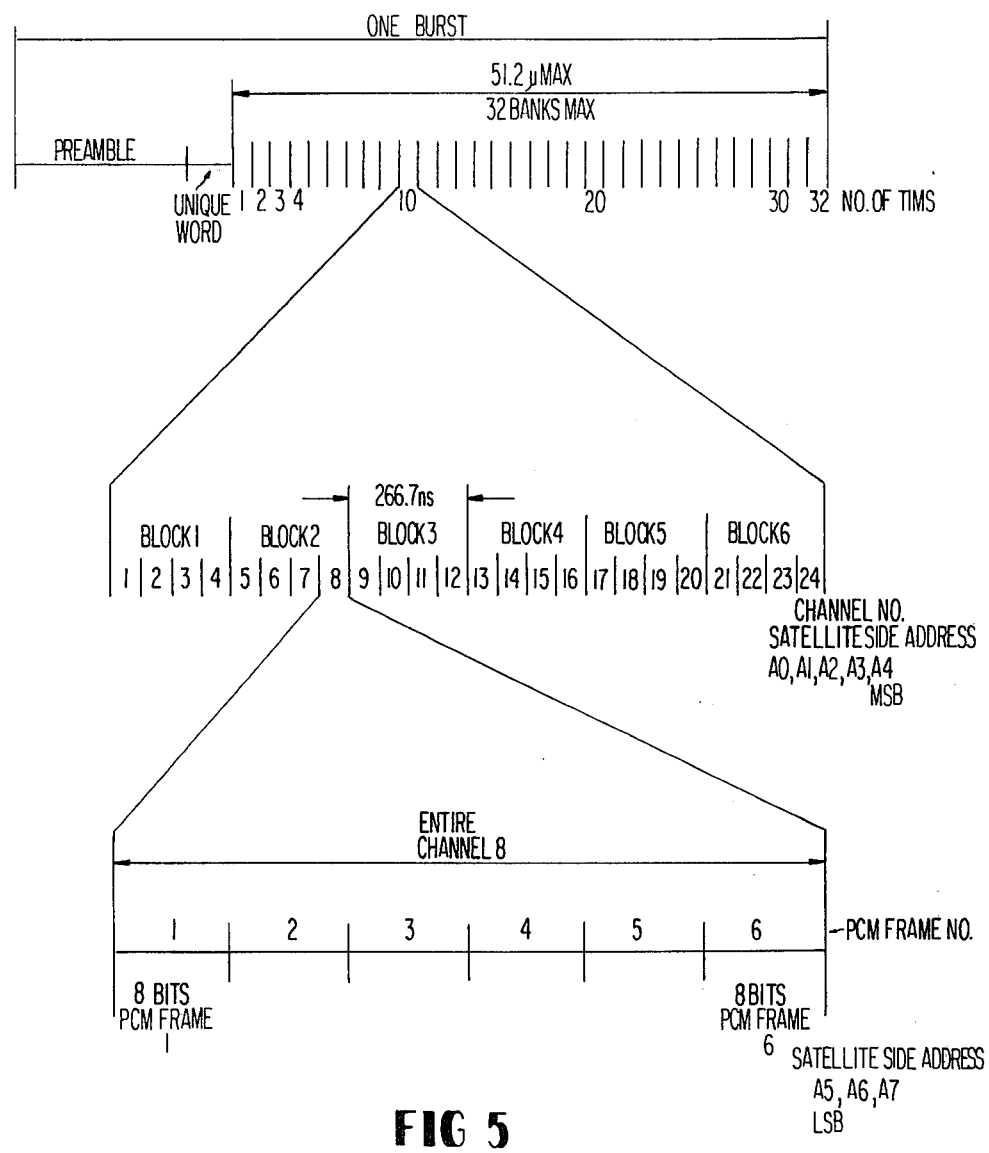
FIG. 5 illustrates the same PCM data reorganized so as to pack an entire channel of data into a contiguous block of time.

A comparison of FIGS. 4 and 5 illustrates how this reorganization is achieved. Reiterating, bits $A_0$ through $A_4$ indicate from which of the 24 channels the 8 bit data sample belongs while bits $A_5$ through $A_7$ indicate in which of the PCM frames within a single TDMA frame the sample belongs. The 8 bit data samples are read out of memory under the control of counter 57 having address bits $A_5$ through $A_7$, $A_0$ and $A_2$ as outputs, and mapping RAM 55 having $A_2$-$A_4$ as outputs, $A_5$ being the least significant bit and $A_4$ being the most significant bit in the address. Inasmuch as bits $A_5$ through $A_7$ are cycled through before bits $A_0$ through $A_4$, 8 bit samples from a single channel (defined by $A_0$ through $A_4$) will be sequentially read from compression buffers 45 or 50 from consecutive PCM frames 1 through 6 as defined by $A_5$ through $A_7$. As the first channel sample is read out of memory from the six PCM frames, counter 57 which delivers the bits $A_5$ through $A_7$ will reset and bits $A_0$ through $A_4$ will increment so that the next channel will be read out from each of the six PCM frames within the TDMA frame. Bits $A_0$-$A_4$ will similarly reset upon counting 24 channels.

The reorganized data shown in FIG. 5 illustrates that an entire PCM channel (channel "8" for example) is now "packed" within a single block of time. As each of the channels is so packed, the data is rearranged in consecutive channels as shown and grouped into blocks of four channels defined by the bits $A_2$ through $A_4$, three bits defining one of six blocks of data. The particular channel within any one of the blocks is defined by bits $A_0$ and $A_1$.

Figure 3:
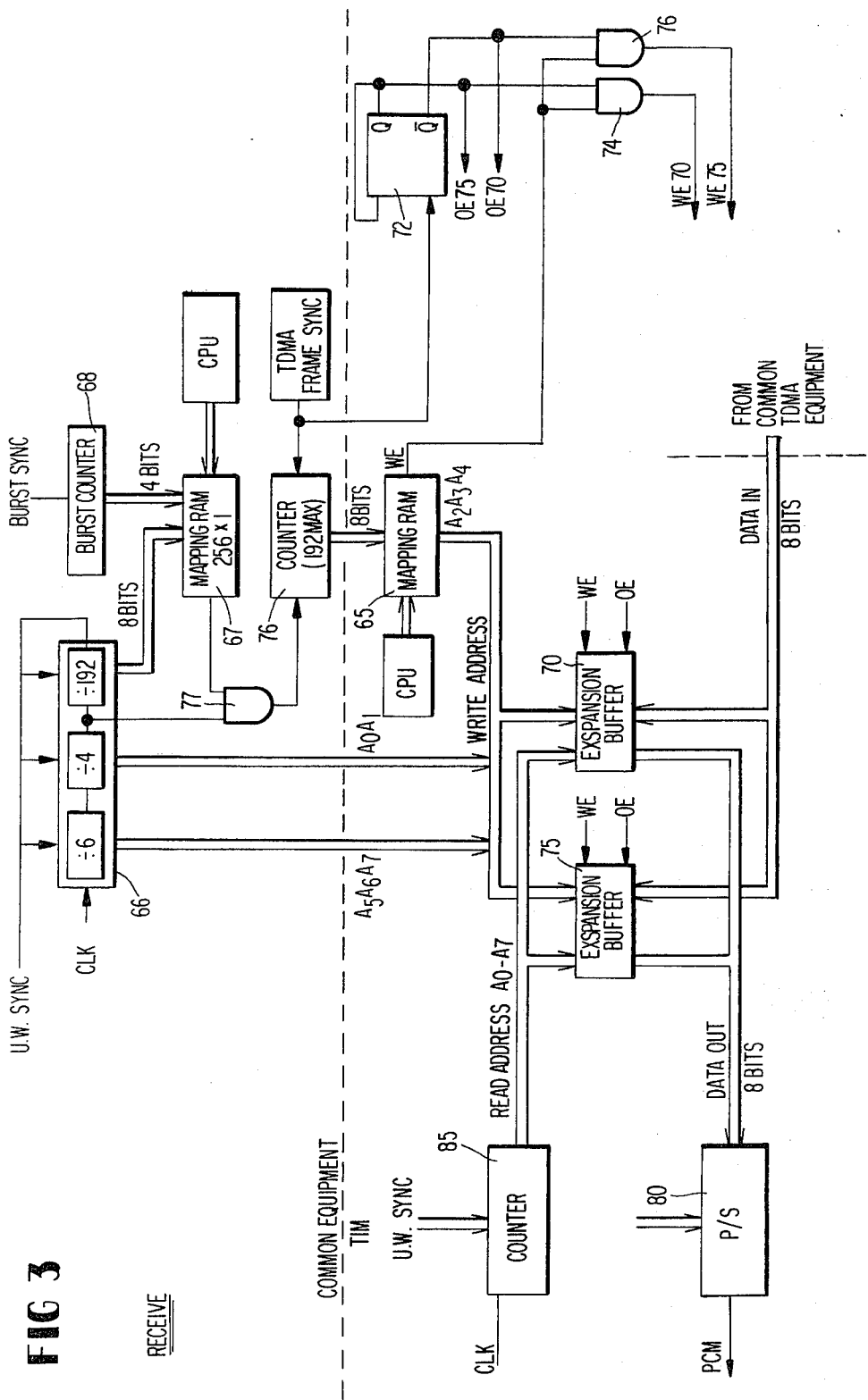
FIG. 3 is an illustration of the interrelationship between the common equipment and each of the terrestrial interface modules for the receive portion of the ground station equipment.

Referring to FIG. 1, rearranged data is delivered to the remaining TDMA system, via the common TDMA equipment, where it is transmitted to a communications satellite. Data returning to the common TDMA equipment 25 from a communications satellite is delivered from the common TDMA equipment 25 to the various TIMs 15a through 15n along bus structure 20. The receive portion of the various TIM's common equipment, and the associated bus structure are illustrated in FIG. 3. Address bits $A_5$-$A_7$, $A_0$ and $A_1$ are delivered from the counter 66 in the TDMA common equipment directly to the write address bus, while bits $A_2$-$A_4$ are delivered to the address bus from mapping RAM 65. The data from the common TDMA equipment is applied to the 8 bit data bus as shown in FIG. 3. Data is written into one of expansion buffers 70, 75 under the control of write enable pulses WE 70 and WE 75 produced by AND gates 74 and 76. The flip-flop 72 is operated synchronously with the TDMA frame in a well-known manner to produce output enable pulses OE 70 and OE 75 and provides the "ping-pong" operation of expansion buffers 70 and 75 similar to the "ping-pong" operation of compression buffers 45 and 50. The write address bus is hard wired to buffers 70 and 75 so that bit $A_5$ constitutes the least significant bit of the address while bit $A_4$ is the most significant bit. In this manner, the data is written into the expansion buffer 70 and 75 in the same manner as it was read out of compression buffers 45 and 50.

Contemporaneously with the above mentioned write operation into one of expansion buffers 70 and 75, a read operation is effected in the other of the expansion buffers. The read address delivered to the expansion buffers is produced by counter 85 synchronized in a well-known manner with the unique word contained in the preamble of the burst illustrated in FIG. 5 and clocked at the PCM data word rate. Bits $A_0$ through $A_7$ in the read address are hard wired to the expansion buffers 70 and 75 so that bit $A_0$ is the least significant bit and bit $A_7$ is the most significant bit. In this manner the data is rearranged from the format illustrated in FIG. 5 to the terrestrial side format illustrated in FIG. 4. The data so read out of the other of expansion buffers 70 and 75 is delivered to parallel to serial converter 80 to provide a serial bit stream of PCM data to one of the associated PCM channel banks 10a through 10n.

The address mapping function of mapping RAMs 55, 65 and 67 will now be discussed. In FIG. 1, it is seen that a multiplexing and demultiplexing operation must be effected between the plurality of TIMs 15a-15n and the common TDMA equipment 25. Prior art techniques employ standard multiplexerdemultiplexer systems which are large in size and inflexible in nature. That is, the channel allocation for each burst of data for each TIM must be preset by the multiplexer and changes in channel and/or burst allocation for any one of the TIMs requires a substantial reorganization of the multiplex/demultiplex operation.

The TIM bus structure of the present invention employs the mapping RAMs 55, 65 and 67 so that channel and burst allocation for the TIMs can be changed in real time, and the flexibility of the channel and burst allocation is greatly enhanced over the prior art systems.

With reference to FIG. 2, the mapping operation of the transmit portion of the TIM bus structure will be described. As noted above the counter 57 counts at the PCM data word rate (PCM frame number, FIG. 5), and is synchronized with each burst by means of the unique word synchronization signal. The counter 57 is comprised of three portions: a first divide by 6 portion having a 3 bit output and connected to a second divide by 4 portion having a 2 bit output. The divide by 4 portion of counter 57 is further connected to a divide by 192 portion having an 8 bit output. The divide by 6 portion of counter 57 comprises the least significant bits in the counter $A_5$, $A_6$ and $A_7$, which correspond to the identification of the PCM frame number of the PCM word currently being read from one of compression buffers 45 or 50 (see FIG. 5). The next two bits $A_0$ and $A_1$, the outputs from divide by 4 portion of counter 57, indicate in which of the four channels within the six blocks the PCM data word currently being processed belongs. The 8 bit output of the next portion of counter 57 indicates which block of data is currently being read from one of compression buffers 45 or 50. With reference to FIG. 5, it is noted that each TIM typically contains 24 channels of data, the channels being divided up into six blocks of four channels each. Inasmuch as the example used in accordance with the present invention employs up to 32 TIMs, there are 192 (6×32) blocks which must be identified within any one burst of data. The divide by 192 portion of counter 57 so defines the particular block of data within the entire burst which is presently being read out of one of compression buffers 45 or 50.

The 8 bit block identification number is delivered to mapping RAM 55 which is contained in each of the TIMs 15a through 15n. Each of the mapping RAMs in the TIMs are individually programmed so as to recognize the particular block of data defined by the 8 bit identification number, and to provide the output enable signal OE whenever the mapping RAM determines that its associated TIM should provide that particular block of data. This represents a simple decoding of the block by each TIM and provides the TIM with the information as to when it should transmit data to the common equipment. For example, TIM No. 10 can be assigned to transmit data on blocks 5, 150 and 151 by having the mapping RAM 55 in TIM No. 10 simply recognize blocks 5, 150 and 151 from the 8 bit input from counter 57 and deliver the output enable signal in response thereto.

Insofar as mapping RAM 55 for each of the TIMs "knows" which of the 192 blocks is currently being processed, in addition to providing the output enable signal, it can be further programmed to provide bits $A_2$ to $A_4$ to the read address since these bits define which of the six blocks of data is being processed by the individual TIM. In the example shown in FIG. 5, a count of "150" from divide by 192 portion of counter 57 would produce a "block 1" indication from bits $A_2$-$A_4$. As counter 57 increments to indicate that block 151 is being processed, mapping RAM 55 would indicate "block 2" on bits $A_2$-$A_4$.

It can now be seen that the mapping RAM arrangement allows the allocation of any one of the 192 blocks of data to any particular TIM in any particular order. Each of the four channels of data contained in any one of the blocks so processed by the TIM contains the *entire* channel information for an entire PCM frame. The subsequent addition or changes to the number of PCM channels, therefore, has little effect on the entire PCM/TDM system. Any changes needed to compensate for changes in system requirements can be accomplished by simply reprogramming the mapping RAMs 55 which are in communication with a central processing unit as shown. This reprogramming of the mapping RAMs can also effect a simple change in channel allocation as desired.

The receive portion of the TIM bus structure will be discussed with reference to FIGS. 3 and 6. FIG. 6 illustrates the general format of an entire frame of TDMA data. The TDMA frame consists of a series of bursts, each burst provided by a unique ground station.

Each of the ground stations in communication with the transponding satellite can select the particular stations from which it receives data. The TIMs on the receive side of the terrestrial station can further choose which of the channels (in blocks of 4) it wishes to receive from any one of the station bursts within the TDMA frame. The common TDMA equipment as shown in FIG. 3 consists of a 4 bit burst counter 68 which is clocked by the burst synchronization signal which is provided in a well-known manner. In this way the counter 68 keeps track of which particular burst is currently being received by the common equipment and delivers this information in 4 bits to mapping RAM 67. Counter 66 is similar to the counter 57 of FIG. 2 and keeps track of which PCM frame number, channel number and block number is currently being received by the common equipment. The mapping RAM 67 is programmed first to recognize the particular burst from which it desires to receive information. It should be noted that with the arrangement of mapping RAMs shown in FIG. 3, any one of the TIMs in the associated terrestrial station can receive information from any combination of the plurality of bursts illustrated in FIG. 6 by programming the mapping RAM to provide the appropriate output when the chosen burst is being received. Mapping RAM 67 further keeps track of which of the 192 blocks of information is currently being received within the particular burst as indicated by divide by 192 portion of counter 66. Whenever mapping burst RAM 67 determines that the particular block of information in the particular burst presently being received by the common equipment corresponds to a block of data which is to be received by one of the TIMs, it produces a 1 bit output which is applied to AND gate 77. The output of divide by 4 portion of counter 66 is also applied to the second input of AND gate 77. The 1 bit output from mapping RAM 67 (low in this case) allows the AND gate 77 to pass the clocked count from counter 66 to counter 76. This arrangement effects an initialization of the block count in counter 76 so that block No. 1 from burst I will not be confused with block No. 1 from burst I+1. In other words, the counter 76 will sequentially reorganize the blocks of data which are to be received by the common equipment over the entire TDMA frame as shown in FIG. 6. The counter 76 counts to a maximum of 192 blocks for reception and delivers the 8 bit block count to each of the receive portions of TIMs 15a through 15n. The mapping RAM 65 of each of the TIMs "recognizes" the particular reorganized block of data presently being delivered on the 8 bit data input line from the common equipment and produces a write enable pulse whenever that particular block of data is assigned to the associated TIM.

TABLE I

| 8 BIT Address | RAM 55 OR 65 (Block No.) | OUTPUT BITS $A_2A_3A_4$ | Enable/Disable |
|---|---|---|---|
| 00000000 | (0) | XXX | D |
| — | — | — | |
| — | — | — | |
| — | — | — | |
| — | — | — | |
| 00000110 | (6) | 110 | E |
| 00000111 | (7) | XXX | D |
| — | — | — | |
| — | — | — | |
| 00100000 | (32) | 010 | E |
| 00100001 | (33) | 011 | E |
| 00100010 | (34) | XXX | D |
| — | — | — | |
| — | — | — | |
| — | — | — | |

The mapping RAMS 55, 65 and 67 are programmed to provide the above-mentioned input/output functions in a manner well-known to those skilled in the art. Table I is provided to illustrate one of many schemes of programming RAMs 55 or 65. The memories are provided with a 4 bit output corresponding to bits $A_2$ through $A_4$ and the enable output. These outputs are located in locations of memory defined by the 8 bit address. In the example shown in Table I, the mapping RAMs 55 or 65, respectively, read or write in response to blocks 6, 32 and 33. When these blocks are indicated on the 8 bit input lines to RAMs 55 or 65 each RAM will output the appropriate enable signal to effect an output or write operation and will further provide bits $A_2$ through $A_4$. The example shown in Table I assigns block 6 (out of 192 blocks) as block 6, block 32 as block 2 (bits $A_5$ through $A_7$, $A_0$ and $A_1$ have changed since block 6), and block 33 as block 3. The particular assignment of blocks in the mapping process is a matter of choice and merely requires that the users keep track of the particular assignments. The programming of mapping RAM 67 is simplified insofar as it need only produce a 1 bit output corresponding to the proper block and burst for reception.

Mapping RAMS 55, 65 and 67 are connected to a CPU whereby a reorganization of the data selected by any one or all of the TIMs can be effected. A simple reprogramming of mapping RAMs 67 can change the burst or bursts from which information is received at the TIMs so that the TIMs can receive information from any terrestrial station contributing a burst to the TDMA frame. The particular block of data within any one of the selected bursts can also be selected by any one of the TIMs through a simple reprogramming of mapping RAM 65 by the CPU in a manner similar to that of the transmit mapping RAM 55, FIG. 2.

Thus, the present invention teachs a technique for performing a data reorganization so as to "pack" an entirePCM channel within a single block of time. The invention further teaches the use of a plurality of mapping RAMs to effect a compact and flexible bus structure for interfacing a plurality of TIMs with common TDMA equipment.

Various changes, additions and omissions of elements may be made within the scope and spirit of the invention and it is to be understood that the invention is not limited to specific details, examples and preferred embodiment shown and described.

We claim:

1. An apparatus for selectively multiplexing a plurality of data sources with equipment common to each of said data sources, comprising:
    a first memory means in each of said data sources for receiving and storing input data at a data rate, said first memory, in response to an output enable signal and a plural bit read address signal, providing to said common equipment data specified by said read address signal, said read address signal having first and second portions;
    counter means in said common equipment for counting at said data rate, said counter having a first section providing said first portion of said plural bit read address signal and a second section;
    second memory means in each said data source, said second memory means receiving a plural bit output from said second counter section as an address input and providing a corresponding second memory output, the output of said second memory comprising said second portion of said read address signal.

2. An apparatus as defined in claim 1, wherein at least one bit of said second memory output, provided in response to said second counter output, comprises said output enable signal, whereby said second memory means in each of said data sources selectively control which of said data sources provide data to said common equipment.

3. An apparatus for selectively demultiplexing a sequence of data from equipment common to a plurality of data users, comprising:
    first memory means in each of said data users for receiving data from said common equipment at a data rate and, in response to a write enable signal and a plural bit write address signal, storing said data at memory locations specified by said write address signal, said write address signal including first and second portions, said first memory providing output data to its respective data user in response to an output enable signal and a read address;
    first counter means in said common equipment for counting at said data rate, said counter having a first section providing said first portion of said write address signal and a second section;
    second counter means in said common equipment for providing a first set of read address outputs;
    second memory means in each of said data users, said second memory means receiving the output from said second counter as an address input and providing a corresponding second memory output, the output of said second memory comprising said second portion of said write address signal.

4. An apparatus as defined in claim 3, wherein at least one bit of said second memory output, provided in response to said second counter, output comprises said first enabling signal, whereby said first memory means in each of said data users stores only selected portions of said sequence of data received from said common equipment.

5. An apparatus as defined in any one of claims 1 through 4, wherein said second memory means is programmable, said apparatus further comprising control means for programming said second memory means to thereby vary the correspondence between said second memory address input and said second memory output.

6. An apparatus for selectively multiplexing a plurality of data sources with equipment common to each of said plurality of data sources, comprising:
    first memory means in each of said data sources for receiving input data at a data rate and storing said data at locations specified by a write address sequence, said first memory, in response to an output enable signal, and a plural bit read address signal, providing to said common equipment data specified by said plural bit read address signal;
    counter means in said common equipment for counting at said data rate, at least a portion of the output of said counter being provided as a second memory address input; and
    programmable second memory means in each of said data sources for providing at least a portion of said write address signal in response to said second memory address input; and
    control means for programming said second memory means to thereby control the correspondence between said second memory means output and said second memory address input.

7. An apparatus as defined in claim 6, wherein at least one bit of said second memory means output, provided in response to said second memory address input, comprises said first enabling signal, whereby said programmable second memory means controls which of said data sources provides data to said common equipment.

8. The apparatus of claim 2, wherein said output enable signal in each said data source causes said associated first memory to select data from a bank of input data stored in said first memory, said selected data to be delivered to said common equipment such that said common equipment receives a sequence of data from a plurality of said data sources.

9. The apparatus of claim 8, wherein said sequence of data is arranged in a series of said data banks, each said data bank arranged in a series of blocks, each said block arranged in a series of data channels, each said data channel arranged in a series of PCM frames.

10. The apparatus of claim 9, wherein said first portion of said read address signal identifies (i) one of said channels in said selected data and (ii) one of said PCM frames in said identified channel.

11. The apparatus of claim 10, wherein said second portion of said read address signal identifies one of said blocks in said sequence of data.

12. The apparatus of claim 1, wherein said second portion of said read address signal identifies one of said blocks in said selected data bank.

13. The apparatus of claim 12, wherein each said block comprises at least one said data channel.

14. The apparatus of claim 12, wherein not more than one said second memory means in each said data source provides said output enable signal at any time during said sequence of data.

15. The apparatus of claim 4, wherein said common equipment provides a frame of data to said data users, said write enable signal in each data user causing said associated first memory to write into said associated first memory selected data from a selected data bank in said frame of data, said selected data to be delivered to said data user.

16. The apparatus of claim 15, wherein said frame of data is arranged in a series of sequences, each said sequence of data arranged in a series of said data banks, each said data bank arranged in a series of blocks, each said block arranged in a series of data channels, each said data channel arranged in a series of PCM frames.

17. The apparatus of claim 16, wherein said first portion of said write address signal identifies (i) one of said channels in said selected data and (ii) one of said PCM frames in said identified channel.

18. The apparatus of claim 17, wherein said first set of read address signal identifies one of said blocks in said frame of said data.

19. The apparatus of claim 18, wherein said second portion of write address outputs identify one of said blocks in said selected data bank.

20. The apparatus of claim 19, wherein each said block comprises at least one said data channel.

21. The apparatus as in claim 3, or any one of claims 15 through 20, further comprising a third counter in said common equipment and a third memory means in said common equipment, said second section of said first counter and said third counter providing a second set and a third set of read address outputs, respectively, to said third memory means, said third memory means providing a count enable signal to said second counter means.

22. The apparatus of claim 21, wherein said second set of read address outputs identify one of said blocks in one of said sequences of data, and said third set of read address outputs identify one of said sequences of data in said frame of data.

* * * * *

UNITED STATES PATENT AND TRADEMARK OFFICE
CERTIFICATE OF CORRECTION

PATENT NO. : 4,319,352

DATED : March 9, 1982

INVENTOR(S) : Shanti Gupta et al

It is certified that error appears in the above—identified patent and that said Letters Patent is hereby corrected as shown below:

IN THE SPECIFICATION:

Column 1, line 66 - change "streamm" to --stream--

Column 2, line 2 - change "sequentail" to --sequential--

Column 2, line 9 - change "exhanging" to --exchanging--

Column 4, line 18 - delete one of "PCM"

Column 5, line 38 - change "A4" to --$A_4$--

Column 5, line 64 - change "multiplexerdemultiplexer" to --multiplexer/demultiplexer--

Column 6, line 48 - after "block" insert --number--

Column 7, line 49 - delete "burst"

Column 8, line 66 - change "entirePCM" to --entire PCM--

UNITED STATES PATENT AND TRADEMARK OFFICE
CERTIFICATE OF CORRECTION

PATENT NO. : 4,319,352
DATED : March 9, 1982
INVENTOR(S) : Shanti Gupta et al

It is certified that error appears in the above—identified patent and that said Letters Patent is hereby corrected as shown below:

IN THE CLAIMS:

Column 10, line 7 - change "multiplexinga" to --multiplexing a--

Column 10, line 55 - change "claim 1" to --claim 11--

Column 12, line 2 - change "outputs identify" to --signal identifies--

Signed and Sealed this

Twentieth Day of July 1982

[SEAL]

Attest:

Attesting Officer

GERALD J. MOSSINGHOFF
Commissioner of Patents and Trademarks